United States Patent Office 3,738,822
Patented June 12, 1973

3,738,822
GIBBERELLIN PREPARATIONS
Yutaka Asahi, Hyogo, and Hideo Nakamachi, Osaka, Japan, assignors to Takeda Chemical Industries, Ltd., Higashi-ku, Osaka, Japan
No Drawing. Filed Mar. 28, 1969, Ser. No. 811,653
Int. Cl. A01n 9/12
U.S. Cl. 71—89                                  8 Claims

ABSTRACT OF THE DISCLOSURE

The solubility of the gibberellins in aqueous solutions is improved by incorporating at least one member of the group consisting of a neutral amino acid having pKa value of 3 to 5, a salt of an acidic amino acid having a pKa value due to at least one of the carboxyl groups of 3 to 5 and a basic amino acid having pKa value due to at least one of the ammonium groups of 8 to 13. Compositions having growth promoting activity are also provided.

---

This invention relates to novel and useful gibberellin preparations containing specific amino acids.

The gibberellins have been used as growth regulators of plants. However, gibberellins are sparingly soluble in water, which inevitably invites difficulties in their practical application.

Although, attempts have been made to increase the solubility of gibberellins in water, thus far these have been far from bringing about desired results. In some cases there is even observed the reduction of the stability of gibberellins themselves. Thus, it has been a desideratum to sufficiently improve solubility of gibberellins in water without sacrificing stability.

The desideratum can be realized by the present invention which relates to gibberellin preparations characterized by incorporating therein one or more of the amino acids selected from the group consisting of (1) a neutral amino acid having pKa value of 3 to 5 due to the carboxyl group, (2) a salt of an acidic amino acid having pKa value of 3 to 5 due to at least one of the carboxyl groups and (3) a basic amino acid having pKa value of 8 to 13 due to at least one of the ammonium groups. The gibberellin preparations of the present invention are readily soluble in water and thus prepared aqueous solution can be stored for a long period of time without substantial decomposition of the gibberellin.

The neutral amino acid employable in the present invention is that having a pKa value of 3 to 5, more desirably 4 to 5, and is exemplified by ε-amino-n-caproic acid, 7-amino-n-heptanoic acid, tranexamic acid, δ-amino-n-valeric acid, β-alanine, β-amino-n-butyric acid, β-amino-i-butyric acid, γ-amino-n-butyric acid, γ-amino-n-valeric acid, etc. The salt of acidic amino acid employable in the present invention is that having a pKa value of 3 to 5, more desirably 4 to 5 due to at least one of the carboxyl groups. Typical of these is a metal salt of glutamic acid (e.g. monosodium glutamate, etc.), monoammonium salt of glutamic acid. The basic amino acid employable in the prescent invention is that having pKa value 8 to 13 due to one of the ammonium groups and is exemplified by arginine, lysine, etc.

Among the neutral amino acids, the salts of acidic amino acids and the basic amino acids, the neutral amino acids are preferably, particularly ε-amino-n-caproic acid is most advantageously used for the object of the present invention.

These amino acids may be employed solely, or in combination of two or more of them, so far as they exhibit no hindrance to the object of this invention.

There have been known many kinds of gibberellin homologues such as gibberellin A group (e.g. $A_1$, $A_2$ ... $A_{13}$), gibberellin TA group (e.g. $TA_{14}$, $TA_{15}$, $TA_{16}$), gibberellin B group and gibberellin C group, and these are all employable for plant growth regulating agents. In this specification, the term "gibberellin(s)" means any of these homologues or optionally a mixture of them whether they are obtained from natural source or artificially admixed. Any of such homologues or mixtures thereof may be solubilized without sacrificing the stability by the present invention. Among the homologues, gibberellin $A_3$ is most generally used.

The gibberellin preparation of the present invention is made by incorporating such amino acids as defined above with the gibberellin.

The amount of the amino acid to be incorporated in the gibberellin preparations of the present invention is generally about 0.1 to about 10 moles, preferably about 1 to about 4 moles relative to one mole of the gibberellin.

Into the gibberellin preparations of the present invention, there may be incorporated any substances other than gibberellin and the amino acid so far as they do not adversely affect the gibberellin preparations. These substances may be adjuvants (e.g. lactose, cellulose, carboxymethylcellulose, starch, talc, etc.), extenders (e.g. polyoxyethylenesorbitan monooleate, dioctylsulfosuccinate, polyethylene glycol, polyvinyl pyrrolidone, colloidal silica, etc.), coloring agents, preservatives, and the like.

The gibberellin preparations of the present invention are prepared, for example, by mixing the ingredients as homogeneously as possible in a conventional manner.

The gibberellin preparations of the present invention are usable as growth regulators of plants with far less difficulty, due to their high solubility without accompanying decomposition.

For further detailed explanation of the present invention, the following tests and examples are given, wherein relation between part(s) by weight and par(s) by volume corresponds to that between gram(s) and milliliter(s).

Test I (Solubility)

To 10 milliliters of an aqueous solution containing the amount of amino acid listed in the following table is added gibberellin excessively to the amount of gibberellin to be dissolved, and the mixture is vigorously shaken in a test tube with glass stopper at 23° C. for 72 hours, at the end of which time the resultant is filtered to separate the insoluble gibberellin. The amount of gibberellin dissolved in the aqueous solution is calculated on the basis of the amount of the insoluble gibberellin. The result is shown in the following table.

TABLE

| Amino acid | pKa value | Amount of amino acid (mole/liter) | Amount of gibberellin [1] dissolved (mole/liter) |
|---|---|---|---|
| Neutral amino acid: | (COOH) | | |
| None (control) | | 0 | 0.017 |
| β-alanine | 3.55 | 0.2 | 0.060 |
| β-amino-n-butyric acid | 3.4 | 0.2 | 0.053 |
| γ-amino-n-butyric acid | 4.03 | 0.2 | 0.059 |
| β-amino-i-butyric acid | 3.6 | 0.2 | 0.052 |
| γ-amino-n-valeric acid | 4.0 | 0.125 | 0.045 |
| δ-amino-n-valeric acid | 4.2 | 0.26 | 0.096 |
| ε-amino-n-caproic acid | 4.43 | 0.1 | 0.074 |
| Do | 4.43 | 0.2 | 0.105 |
| Do | 4.43 | 0.3 | 0.136 |
| Do | 4.43 | 0.4 | 0.174 |
| Do | 4.43 | 0.6 | 0.236 |
| 7-amino-n-heptanoic acid | 4.5 | 0.2 | 0.108 |
| Do | 4.5 | 0.4 | 0.176 |
| Tranexamic acid | 4.4 | 0.2 | 0.107 |
| Basic amino acid: | $(NH_3^+)$ | | |
| Arginine | 9.04, 12.48 | 0.2 | 0.226 |
| Lysine | $(NH_3^+)$ 8.59, 10.53 | 0.2 | 0.230 |
| Salt of acidic amino acid: | (COOH) | | |
| Monosodium glutamate | 4.07 | 0.2 | 0.080 |

[1] The test compound employed is gibberellin $A_3$.

Test II (Stability)

Into 20 milliliters of water are dissolved 200 milligrams of gibberellin $A_3$ and 200 milligrams of ε-amino-n-caproic acid to prepare a homogeneous aqueous solution. The thus prepared aqueous solution is kept at 50° C. for 24 hours, at the end of which time the residual amount of gibberellin $A_3$ is found to be about 36% by weight relative to the amount originally dissolved.

As a control, 20 milliliters of an aqueous solution containing 200 milligrams of potassium salt of gibberellin $A_3$ is kept under the same conditions as above, at the end of which time the residual amount of the potassium salt of gibberellin is found to be about 3% by weight relative to the amount originally dissolved.

EXAMPLE 1

2 parts by weight of gibberellin $A_3$ is admixed homogeneously with 3 parts by weight of ε-amino-n-caproic acid to yield the gibberellin preparation. The preparation is readily dissolved in 10 parts by volume of water at 23° C., and thus prepared solution is put into practical use.

After the solution is kept at 30° C. for 24 hours, the residual amount of gibberellin $A_3$ is found to be about 85% by weight of the initial content.

EXAMPLE 2

0.2 part by weight of gibberellin (a mixture of 80 parts by weight or $A_3$ and 20 parts by weight of $A_1$) is homogeneously admixed with 0.2 part by weight of ε-amino-n-caproic acid. The mixture is shaped into a tablet by a tablet machine with pressure of about 7 tons/cm.² After the tablet is stored at room temperature for 1 year, no degradation of gibberellin is observed.

On practical use, the tablet is readily dissolved into water.

EXAMPLE 3

Gibberellin preparations are prepared by mixing homogeneously the components in the following prescriptions.

Prescription I: Parts by weight
  Gibberellin $A_3$ _____ 25
  ε-Amino-n-caproic acid _____ 25
  Dioctylsulfosuccinate _____ 30
  Polyvinylpyrrolidone _____ 10
  Polyethyleneglycol _____ 5
  Silica _____ 10
  Cellulose _____ 50
Prescription II:
  Gibberellin $A_3$ _____ 25
  Arginine _____ 11.1
Prescription III:
  Gibberellin $A_3$ _____ 25
  Lysine _____ 9.2

What is claimed is:

1. A plant growth control composition which comprises at least one gibberellin in admixture with at least one member of the group consisting of a neutral amino acid having a pKa value of 3 to 5, a salt of acidic amino acid having a pKa value of 3 to 5 due to at least one of the carboxyl groups, and a basic amino acid having pKa value of 8 to 13 due to at least one of the ammonium groups.

2. A composition as claimed in claim 1, containing a neutral amino acid having pKa value of 3 to 5.

3. A composition as claimed in claim 1, containing a salt of an acidic amino acid having a pKa value of 3 to 5 due to at least one of the carboxyl groups.

4. A composition as claimed in claim 1, containing a basic amino acid having pKa value of 8 to 13 due to at least one of the ammonium groups.

5. A composition as claimed in claim 2, wherein the neutral amino acid is ε-amino-n-caproic acid.

6. A composition as claimed in claim 1, wherein an amount of the amino acid component is from 0.1 to 10 moles relative to one mole of gibberellin.

7. A composition as claimed in claim 1, wherein the amount of the amino acid is from 1 to 4 moles relative to one mole of gibberellin.

8. A metohd for improving the solubility of a gibberellin in water, which comprises admixing with at least one gibberellin at least one member of the group consisting of a neutral amino acid having pKa value of 3 to 5, a salt of an acidic amino acid having a pKa value due to at least one of the carboxyl groups of 3 to 5 and a basic amino acid having pKa value due to at least one of the ammonium groups of 8 to 13.

References Cited

UNITED STATES PATENTS 3,100,149   8/1963   Ruge _____ 71—77

JAMES O. THOMAS, JR, Primary Examiner

UNITED STATES PATENT OFFICE
CERTIFICATE OF CORRECTION

Patent No. 3,738,822                Dated June 12, 1973

Inventor(s) Yutaka Asahi and Hideo Nakamachi

It is certified that error appears in the above-identified patent and that said Letters Patent are hereby corrected as shown below:

Page one, first column, below the line reading "No Drawing. Filed Mar. 28, 1969, Ser. No. 811,653", insert the following:

-- Claim priority, Japan     application no. 20790/68, March 30, 1968 --.

Signed and sealed this 19th day of February 1974.

(SEAL)
Attest:

EDWARD M. FLETCHER, JR.         C. MARSHALL DANN
Attesting Officer                 Commissioner of Patents